United States Patent
He et al.

(10) Patent No.: US 12,130,678 B2
(45) Date of Patent: Oct. 29, 2024

(54) SYSTEM AND METHOD OF CONFIGURING AN INFORMATION HANDLING SYSTEM BASED AT LEAST ON AN AMBIENT TEMPERATURE

(71) Applicant: Dell Products L.P., Round Rock, TX (US)

(72) Inventors: Qinghong He, Austin, TX (US); Adolfo Sandor Montero, Pflugerville, TX (US); Steven Leon Williams, Round Rock, TX (US); David William Grunow, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 17/446,904

(22) Filed: Sep. 3, 2021

(65) Prior Publication Data
US 2023/0070036 A1 Mar. 9, 2023

(51) Int. Cl.
*G06F 1/26* (2006.01)
*G06F 1/16* (2006.01)
*G06F 1/18* (2006.01)
*G06F 1/20* (2006.01)
*G06F 9/50* (2006.01)

(52) U.S. Cl.
CPC ............ *G06F 1/206* (2013.01); *G06F 1/1613* (2013.01); *G06F 1/189* (2013.01); *G06F 1/203* (2013.01); *G06F 9/5094* (2013.01)

(58) Field of Classification Search
CPC ........ G06F 1/206; G06F 1/1613; G06F 1/189; G06F 1/203; G06F 9/5094
See application file for complete search history.

(56) References Cited

U.S. PATENT DOCUMENTS

| | | | | |
|---|---|---|---|---|
| 9,471,117 | B1* | 10/2016 | Spangler | G06F 1/3206 |
| 2005/0216577 | A1* | 9/2005 | Durham | G06F 9/4411 |
| | | | | 709/223 |
| 2010/0153764 | A1* | 6/2010 | Pratt | G06F 3/0482 |
| | | | | 713/320 |

(Continued)

OTHER PUBLICATIONS

Zhang, Han, Alan Hedge, and Beiyuan Guo. "Ambient temperature effects on user thermal sensation with a simulated tablet computer." *Proceedings of the Human Factors and Ergonomics Society Annual Meeting*. vol. 59. No. 1. Sage CA: Los Angeles, CA: Sage Publications, 2015.

*Primary Examiner* — Danny Chan
(74) *Attorney, Agent, or Firm* — McDermott Will & Emery LLP

(57) ABSTRACT

In one or more embodiments, one or more systems, one or more methods, and/or one or more processes may determine a temperature value within a chassis of an information handling system (IHS); may determine an ambient temperature value outside the chassis based at least on the temperature value within the chassis; may provide the ambient temperature value outside the chassis to a process executing on the IHS; may determine a threshold temperature value associated with at least one processor of the IHS based at least on the ambient temperature value outside the chassis and based at least on a target skin temperature value of the IHS; and may configure the at least one processor based at least on the threshold temperature value associated with the at least one processor.

18 Claims, 7 Drawing Sheets

(56) References Cited

U.S. PATENT DOCUMENTS

| | | | | |
|---|---|---|---|---|
| 2010/0217957 A1* | 8/2010 | Berenbaum | G06F 9/455 | 718/1 |
| 2012/0046899 A1* | 2/2012 | Gatts | G06F 1/203 | 702/130 |
| 2012/0324384 A1* | 12/2012 | Cohen | G06F 9/451 | 715/765 |
| 2013/0194176 A1* | 8/2013 | Chung | G06F 1/1684 | 345/156 |
| 2013/0289792 A1* | 10/2013 | Cheng | G06F 1/206 | 700/300 |
| 2014/0240031 A1* | 8/2014 | Vadakkanmaruveedu | G06F 1/206 | 327/512 |
| 2015/0057830 A1* | 2/2015 | Slaby | G06F 1/324 | 700/300 |
| 2015/0181529 A1* | 6/2015 | Birnbaum | H04W 52/0258 | 370/311 |
| 2015/0331462 A1* | 11/2015 | Atkinson | G06F 1/324 | 713/100 |
| 2016/0224081 A1* | 8/2016 | Worthington | G06F 11/3058 | |
| 2016/0266629 A1* | 9/2016 | Merrikh | G06F 1/206 | |
| 2018/0188800 A1* | 7/2018 | Alon | G06F 1/206 | |
| 2018/0245986 A1* | 8/2018 | Pan | G06F 1/206 | |
| 2018/0336398 A1* | 11/2018 | Shenoy | G06V 40/172 | |
| 2019/0272020 A1* | 9/2019 | Woo | G06F 1/1677 | |
| 2019/0310695 A1* | 10/2019 | North | G05D 23/1917 | |
| 2020/0133358 A1* | 4/2020 | Mishra | G06V 10/774 | |
| 2021/0018966 A1* | 1/2021 | Stanley | G02B 27/0176 | |
| 2021/0181820 A1* | 6/2021 | Shenoy | G01K 7/425 | |
| 2021/0182066 A1* | 6/2021 | Shenoy | G06F 1/3296 | |
| 2022/0155833 A1* | 5/2022 | Watanabe | G06F 1/1694 | |
| 2022/0164011 A1* | 5/2022 | Sahu | G06F 1/3206 | |
| 2022/0294439 A1* | 9/2022 | Langer | H02H 5/044 | |

\* cited by examiner

SYSTEM AND METHOD OF CONFIGURING AN INFORMATION HANDLING SYSTEM BASED AT LEAST ON AN AMBIENT TEMPERATURE

BACKGROUND

Field of the Disclosure

This disclosure relates generally to information handling systems and more particularly to configuring an information handling system based at least on an ambient temperature.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A skin temperature of an information handling system can reach values that can lead to user discomfort. This can occur especially in a warm environment in which the information handling system is utilized. A relationship between surface temperature of an object and thermal sensation scores of people has been determined in a study (Proceedings of the Human Factors and Ergonomics Society 59th Annual Meeting (2015), pp. 1090-1094). In one example, higher skin temperatures (e.g., around 44° C.) were rated less warm in cool environments than hot environments. In another example, lower skin temperatures (e.g., 34° C.-38° C.) were rated warmer in cool environments than hot environments. As shown in prior art FIG. 1, comfort scores can be the same or similar for differing surface temperatures of an object at different room temperatures. In prior art FIG. 1, the thermal sensation scale ranged from 0 (extremely cold) to 100 (extremely hot), and the thermal comfort scale ranges from 0 (extremely comfortable) to 100 (extremely uncomfortable) as empirically determined from participants of the study.

SUMMARY

In one or more embodiments, one or more systems, one or more methods, and/or one or more processes may determine a temperature value within a chassis of an information handling system; may determine an ambient temperature value outside the chassis based at least on the temperature value within the chassis; may provide the ambient temperature value outside the chassis to a process executing on the information handling system; may determine a threshold temperature value associated with at least one processor of the information handling system based at least on the ambient temperature value outside the chassis and based at least on a target skin temperature value of the information handling system; and may configure the at least one processor based at least on the threshold temperature value associated with the at least one processor. In one or more embodiments, the one or more systems, the one or more methods, and/or the one or more processes may further configure at least one fan of the information handling system based at least on the target skin temperature value of the information handling system. In one or more embodiments, providing the ambient temperature value outside the chassis to the process executing on the information handling system may include providing the ambient temperature value outside the chassis to information handling system firmware of the information handling system. For example, the information handling system firmware may provide the ambient temperature value outside the chassis to the process executing on the information handling system.

In one or more embodiments, the information handling system may include an embedded controller and a sensor coupled to the embedded controller. For example, determining the temperature value within the chassis may include the embedded determining the temperature value within the chassis from at least one signal from the sensor. In one or more embodiments, the chassis may include a vented port to air outside the chassis. For example, the sensor may be physically located near the vented port. In one or more embodiments, determining the ambient temperature value outside the chassis based at least on the temperature value within the chassis may include the embedded multiplying the temperature value within the chassis by a constant value. In one or more embodiments, determining the ambient temperature value outside the chassis based at least on the temperature value within the chassis may include the embedded utilizing a lookup table to determine the ambient temperature value outside the chassis based at least on the temperature value within the chassis.

In one or more embodiments, configuring the at least one processor may include the process configuring the at least one processor with a maximum amount of power that the at least one processor can utilize. For example, configuring the at least one processor with the maximum amount of power that the at least one processor can utilize may include the process utilizing an INTEL® Dynamic Tuning Technology to configure the at least one processor with the maximum amount of power that the at least one processor can utilize. In one or more embodiments, the embedded controller may be configured to determine a fan speed based at least on the ambient temperature value outside the chassis. For example, configuring the at least one fan based at least on the target skin temperature value of the information handling system may include the embedded controller configuring the at least one fan to operate at the fan speed.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
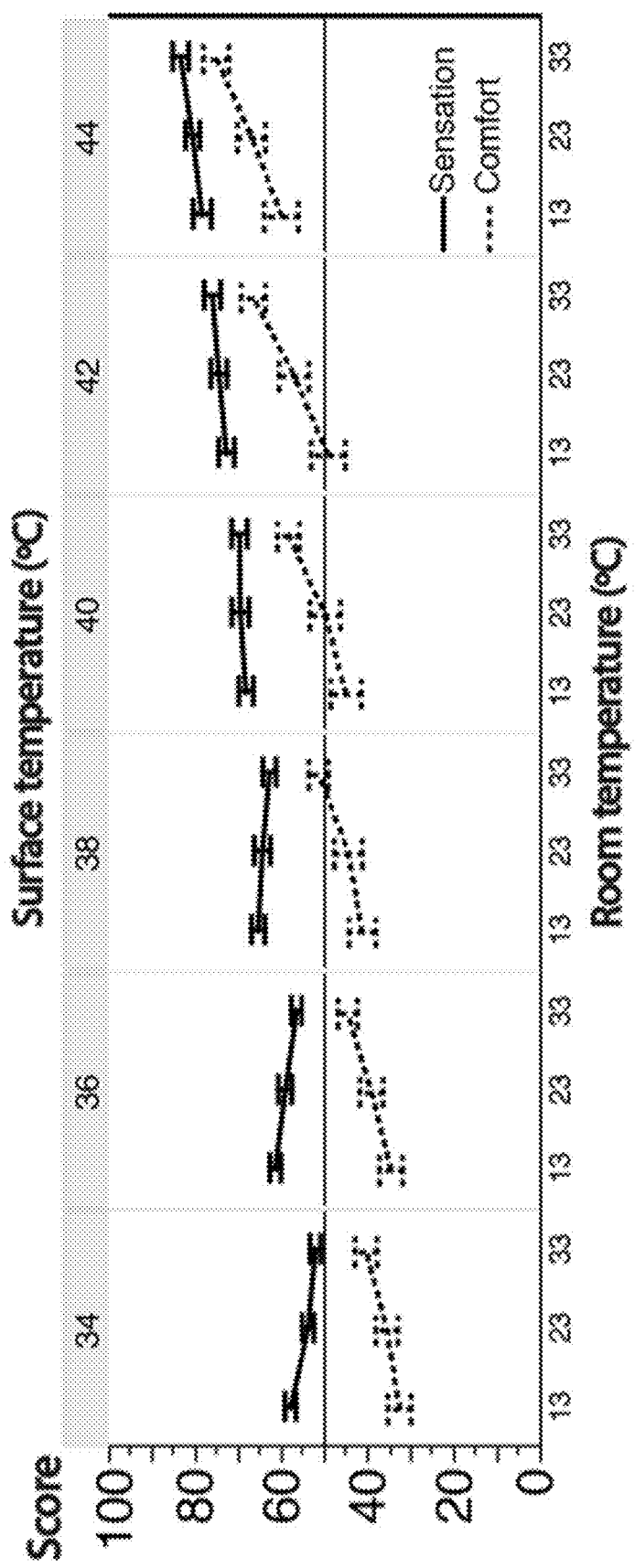
FIG. 1 illustrates a prior art graph of surface temperature of an object and thermal sensation scores of people from a study.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may be configured to be a portable information handling system (e.g., configured to be carried by a user). In one example, a portable information handling system may be or may include a laptop information handling system. In a second example, a portable information handling system may be or may include a tablet information handling system. In a third example, a portable information handling system may be or may include a personal digital assistant (PDA) information handling system. In another example, a portable information handling system may be or may include a mobile telephone (e.g., a smartphone).

In one or more embodiments, a user may be in physical contact with a portable information handling system for various periods of time. In one example, a user may be in physical contact with a keyboard of a laptop information handling system. In a second example, a user may be in physical contact with a touchpad of a laptop information handling system. In a third example, a user may be in physical contact with a touch screen of a laptop information handling system, a PDA information handling system, a tablet information handling system, or a mobile telephone, among others. In a third example, a user may be in physical contact with bottom portion of a housing of a portable information handling system. In one instance, a laptop information handling system may be in physical contact with a lap of a user. In another instance, a user may physically hold a PDA information handling system, a tablet information handling system, or a mobile telephone, among others. In one or more embodiments, one or more of period of time in physical contact with an information handling system and an area size may affect a thermal sensation of a user.

In one or more embodiments, a skin temperature associated with an information handling system may include a temperature of an outer portion of a chassis or a keyboard of the information handling system that is configured to be in contact with a user. In one example, there may be a maximum safe skin temperature that is safe for a user. In another example, there may be a maximum comfortable skin temperature that is comfortable for a user. For instance, a temperature above the maximum comfortable skin temperature may be safe for the user to contact (e.g., to touch) but may be uncomfortable to the user.

In one or more embodiments, one or more components of an information handling system may affect a skin temperature associated with the information handling system. For example, the one or more components of the information handling system that may affect the skin temperature associated with the information handling system may include one or more of a processor, a graphics processing unit (GPU), a non-volatile memory medium (e.g., a hard disk driver, a solid state drive, etc.), a volatile memory medium (e.g., random access memory), and a network interface, among others. For instance, greater utilization of the one or more components of the information handling system that may affect the skin temperature associated with the information handling system may result in higher skin temperatures.

In one or more embodiments, a skin temperature of an information handling system may lead to user discomfort. For example, a skin temperature of an information handling system may lead to user discomfort in a warm environment. For instance, an ambient temperature (e.g., a room temperature, a temperature of a person's environment, etc.) may affect a thermal perception by a user (e.g., a person). As an example, a specific skin temperature of an information handling system may lead to user discomfort at a specific ambient temperature. As another example, the specific skin temperature of the information handling system may not lead to user discomfort at the specific ambient temperature.

In one or more embodiments, at a temperature above thirty-eight degrees Celsius (38° C.), a sensation of hot and thermal comfort may improve at a lower ambient temperature. For example, a user may tolerate higher skin temperatures of information handling systems at lower ambient temperatures. In one or more embodiments, at lower ambient temperatures, a user may tolerate higher skin temperatures. For example, when an information handling system is permitted to generate higher skin temperatures, the information handling system may be able to process more information. For instance, when an information handling system is permitted to generate higher skin temperatures, the information handling system may be able to perform better.

In one or more embodiments, an information handling system may configure one or more components of the information handling system to provide a skin temperature of the information handling system based at least on an ambient temperature proximate to the information handling system. For example, an ambient temperature proximate to the information handling system may be a temperature within twenty centimeters from the information handling system.

In one or more embodiments, a comfort temperature value associated with a user utilizing a keyboard of the information handling system may be fifteen degrees Celsius (15° C.)

above an ambient temperature value (e.g., a temperature value proximate to the keyboard). For example, if an ambient temperature value is twenty-eight degrees Celsius (28° C.), a comfort temperature value associated with the user utilizing the keyboard may be forty-three degrees Celsius (43° C.). Although 15° C. above an ambient temperature value is described, other temperature values above the ambient temperature associated with a keyboard and/or one or more portions of the information handling system may be utilized, according to one or more embodiments. In one or more embodiments, a skin temperature value of 43° C. may be a maximum skin temperature value where a user would be comfortable touching a keyboard or another portion of a chassis of the information handling system. For example, the maximum skin temperature value where the user would be comfortable touching the keyboard or the other portion of the chassis of the information handling system may be exceeded when it is determined that the user not physically interacting with the information handling system or when the user is not physically interacting with the one or more portions of the chassis of the information handling system.

In one or more embodiments, an embedded controller of an information handling system may determine an ambient temperature associated with the information handling system. For example, the embedded controller may determine the ambient temperature associated with the information handling system via one or more sensors. In one or more embodiments, the embedded controller may provide temperature value information to a process. In one example, the process may include a service of the OS. For instance, the service may include a MICROSOFT® WINDOWS® service. In a second example, the process may include a daemon (e.g., a UNIX® daemon, a Unix-like daemon, etc.). In another example, the process may include an application. In one or more embodiments, the process may determine one or more thermal management options and/or one or more component performance management options. For example, the process may modify one or more performance configuration states of the information handling system based at least on temperature value information from the embedded controller.

In one or more embodiments, the process may modify performance capabilities of one or more components of the information handling system based at least on a policy. For example, the background process may include an INTEL® Dynamic Tuning Technology (DTT), which may receive information and/or a notification and may modify performance capabilities of one or more components of the information handling system based at least on the temperature value information from the embedded controller.

In one or more embodiments, the embedded controller may configure a rate of one or more fans of the information handling system. In one example, the embedded controller may configure a first rate of the one or more fans such that the first rate is lower than a current rate of the one or more fans. For instance, the embedded controller may lower a speed of the one or more fans. In another example, the embedded controller may configure a second rate of the one or more fans such that the second rate is high than a current rate of the one or more fans. For instance, the embedded controller may increase a speed of the one or more fans. In one or more embodiments, increasing the speed of the one or more fans may reduce or assist in reducing a skin temperature of the information handling system.

Figure 2A:
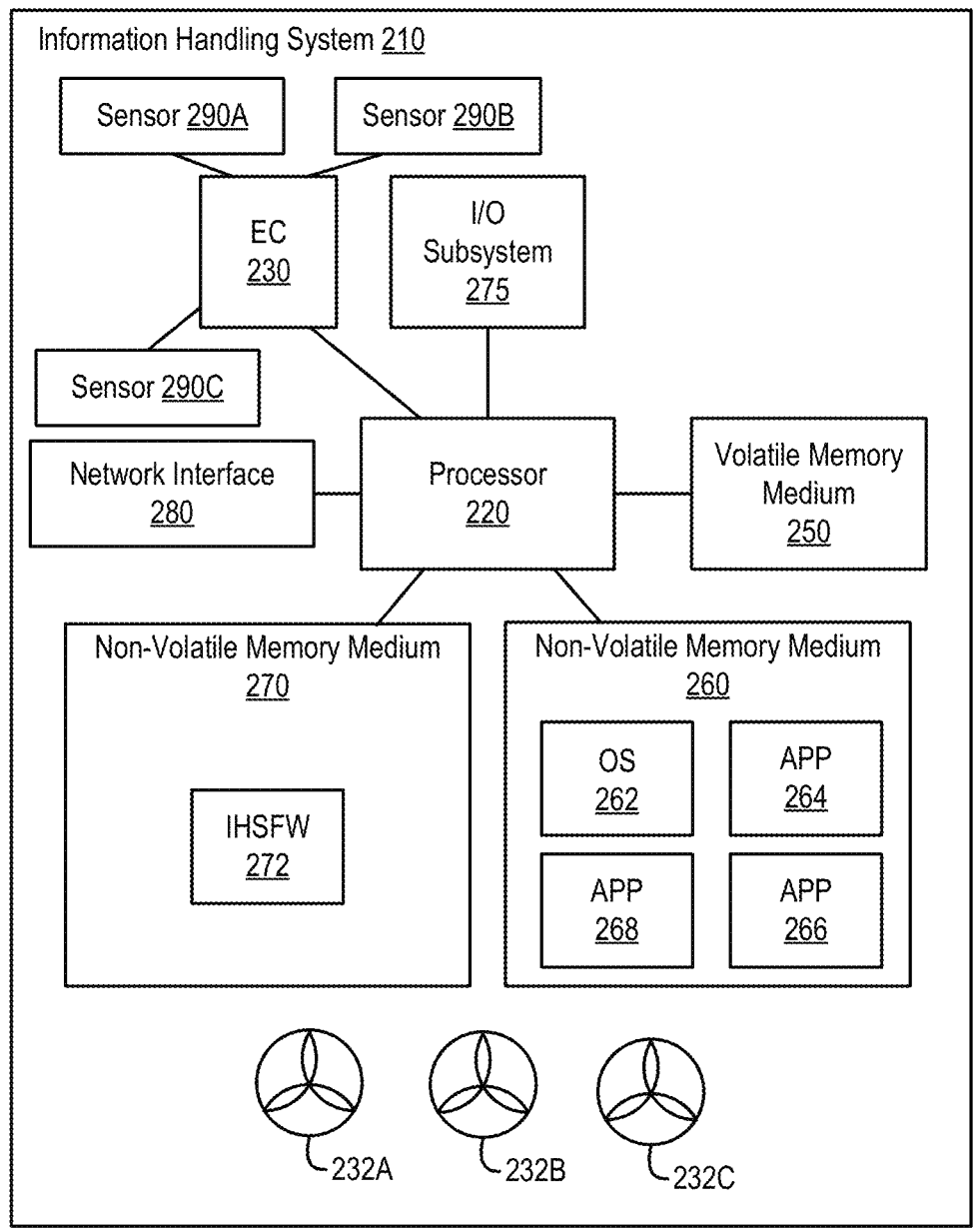
FIG. 2A illustrates an example of an information handling system, according to one or more embodiments.

Turning now to FIG. 2A, an example of an information handling system is illustrated, according to one or more embodiments. An information handling system (IHS) 210 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 210 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 210 may include or have a form factor of that of or similar to one or more of a laptop, a notebook, a telephone, a tablet, and a PDA, among others. For example, a portable IHS 210 may be readily carried and/or transported by a user (e.g., a person). In one or more embodiments, components of IHS 210 may include one or more storage devices, one or more communications ports for communicating with external devices as well as various input and output (I/O) devices, such as a keyboard, a mouse, and a video display, among others. In one or more embodiments, IHS 210 may include one or more buses operable to transmit communication between or among two or more hardware components. In one example, a bus of IHS 210 may include one or more of a memory bus, a peripheral bus, and a local bus, among others. In another example, a bus of IHS 210 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 210 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 210 may include a processor 220, an embedded controller (EC) 230, a volatile memory medium 250, non-volatile memory media 260 and 270, an I/O subsystem 275, and a network interface 280. As illustrated, EC 230, volatile memory medium 250, non-volatile memory media 260 and 270, I/O subsystem 275, and network interface 280 may be communicatively coupled to processor 220.

In one or more embodiments, one or more of EC 230, volatile memory medium 250, non-volatile memory media 260 and 270, I/O subsystem 275, and network interface 280 may be communicatively coupled to processor 220 via one or more buses, one or more switches, and/or one or more root complexes, among others. In one example, one or more of EC 230, volatile memory medium 250, non-volatile memory media 260 and 270, I/O subsystem 275, and network interface 280 may be communicatively coupled to processor 220 via one or more PCI-Express (PCIe) root complexes. In another example, one or more of EC 230, I/O subsystem 275, and network interface 280 may be communicatively coupled to processor 220 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 250 may include volatile storage such as, for example, RAM, DRAM (dynamic RAM), EDO RAM (extended data out RAM), SRAM (static RAM), etc. One or more of non-volatile memory media 260 and 270 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 280 may be utilized in communicating with one or more networks and/or one or more other information handling systems. In one example, network interface 280 may enable IHS 210 to communicate via a network utilizing a suitable transmission protocol and/or standard. In a second example, network interface 280 may be coupled to a wired network. In a third example, network interface 280 may be coupled to an optical network. In another example, network interface 280 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 280 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 220 may execute processor instructions in implementing at least a portion of one or more systems, at least a portion of one or more flowcharts, at least a portion of one or more methods, and/or at least a portion of one or more processes described herein. In one example, processor 220 may execute processor instructions from one or more of memory media 250, 260, and 270 in implementing at least a portion of one or more systems, at least a portion of one or more flowcharts, at least a portion of one or more methods, and/or at least a portion of one or more processes described herein. In another example, processor 220 may execute processor instructions via network interface 280 in implementing at least a portion of one or more systems, at least a portion of one or more flowcharts, at least a portion of one or more methods, and/or at least a portion of one or more processes described herein.

In one or more embodiments, processor 220 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 220 may interpret and/or execute program instructions and/or process data stored locally (e.g., via memory media 250, 260, and 270 and/or another component of IHS 210). In another example, processor 220 may interpret and/or execute program instructions and/or process data stored remotely (e.g., via a network storage resource).

In one or more embodiments, I/O subsystem 275 may represent a variety of communication interfaces, graphics interfaces, video interfaces, user input interfaces, and/or peripheral interfaces, among others. For example, I/O subsystem 275 may include one or more of a touch panel and a display adapter, among others. For instance, a touch panel may include circuitry that enables touch functionality in conjunction with a display that is driven by a display adapter.

As shown, non-volatile memory medium 260 may include an operating system (OS) 262, and applications (APPs) 264-268. In one or more embodiments, one or more of OS 262 and APPs 264-268 may include processor instructions executable by processor 220. In one example, processor 220 may execute processor instructions of one or more of OS 262 and APPs 264-268 via non-volatile memory medium 260. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

As illustrated, non-volatile memory medium 270 may include information handling system firmware (IHSFW) 272. In one or more embodiments, IHSFW 272 may include processor instructions executable by processor 220. For example, IHSFW 272 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 220 may execute processor instructions of IHSFW 272 via non-volatile memory medium 270. In another instance, one or more portions of the processor instructions of IHSFW 272 may be transferred to volatile memory medium 250, and processor 220 may execute the one or more portions of the processor instructions of IHSFW 272 via volatile memory medium 250.

In one or more embodiments, OS 262 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 210) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 262.

In one or more embodiments, processor 220 and one or more components of IHS 210 may be included in a system-on-chip (SoC). For example, the SoC may include processor 220 and a platform controller hub (not specifically illustrated).

In one or more embodiments, EC 230 may be or include a remote access controller. For example, the remote access controller may be or include a DELL™ Remote Access Controller (DRAC). In one or more embodiments, a remote access controller may be integrated into IHS 210. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 210. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 230 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 230 may be or include an application processor. In one example, EC 230 may be or include an ARM Cortex-A processor. In another example, EC 230 may be or include an Intel Atom processor. In one or more embodiments, EC 230 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, IHS 210 may include one or more fans. For example, IHS 210 may include fans 232A-232C. Although IHS 210 is illustrated as including fans 232A-232C, IHS 210 may include any number of fans 232, according to one or more embodiments. In one example, IHS 210 may include one or more fans 232. In another example, IHS 210 may not include a fan 232. For instance, IHS 210 may not include any fans. In one or more embodiments, EC 230 may control one or more of fans 232A-232C. For example, EC 230 may provide control information to a fan controller (not specifically illustrated), which may control one or more of fans 232A-232C. For instance, EC 230 may provide control information to the fan controller via a SMBus. In one or more embodiments, a fan 232 may generate one or more sounds as fan 232 operates to move air. For example, the one or more sounds the fan 232 generates may be quantified as one or more sound pressure levels.

In one or more embodiments, IHS 210 may include one or more sensors. For example, IHS 210 may include sensors 290A-290C. Although IHS 210 is shown with sensors 290A-290C, IHS 210 may include any number of sensors 290, according to one or more embodiments. For example, IHS 210 may include any number of sensors 290 at any number of respective physical locations within IHS 210. In one or more embodiments, sensors 290A-290C may be communicatively coupled to EC 230. For example, EC 290 may receive information from sensors 290A-290C.

In one or more embodiments, a sensor 290 may transform one or more physical phenomena into one or more signals. In one example, a sensor 290 may transform one or more physical phenomena into one or more analog signals and may provide the one or more analog signals to EC 230. For instance, EC 230 may receive the one or more analog signals. In another example, a sensor 290 may transform one or more physical phenomena into one or more digital signals and may provide the one or more digital signals to EC 230. For instance, EC 230 may receive the one or more digital signals. In one or more embodiments, a sensor 290 may provide temperature values to EC 230 via the one or more signals.

Figure 2B:
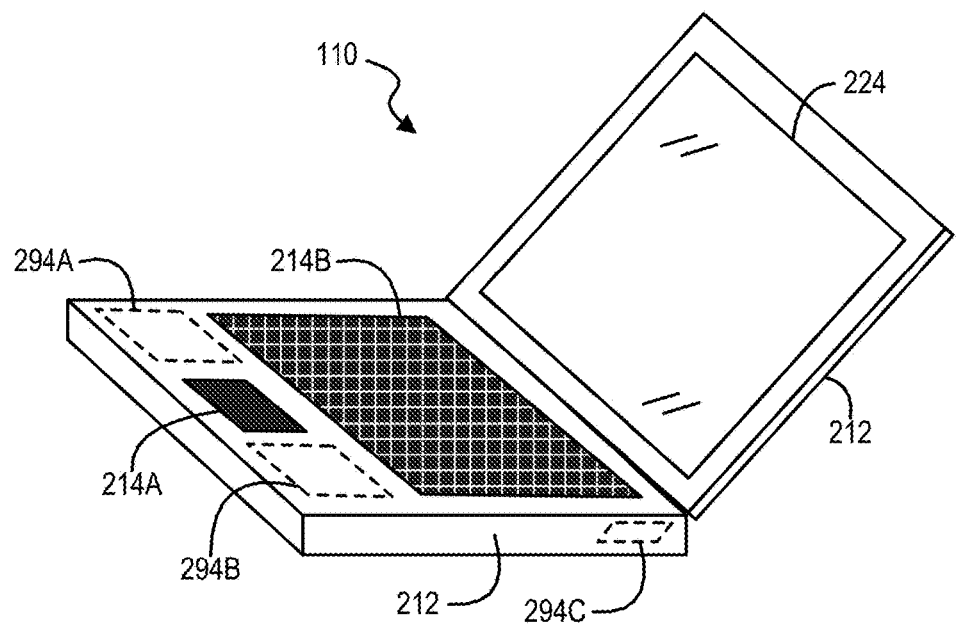
FIG. 2B illustrates a second example of an information handling system and an example of a portion of a keyboard, according to one or more embodiments.
Figure 2B:
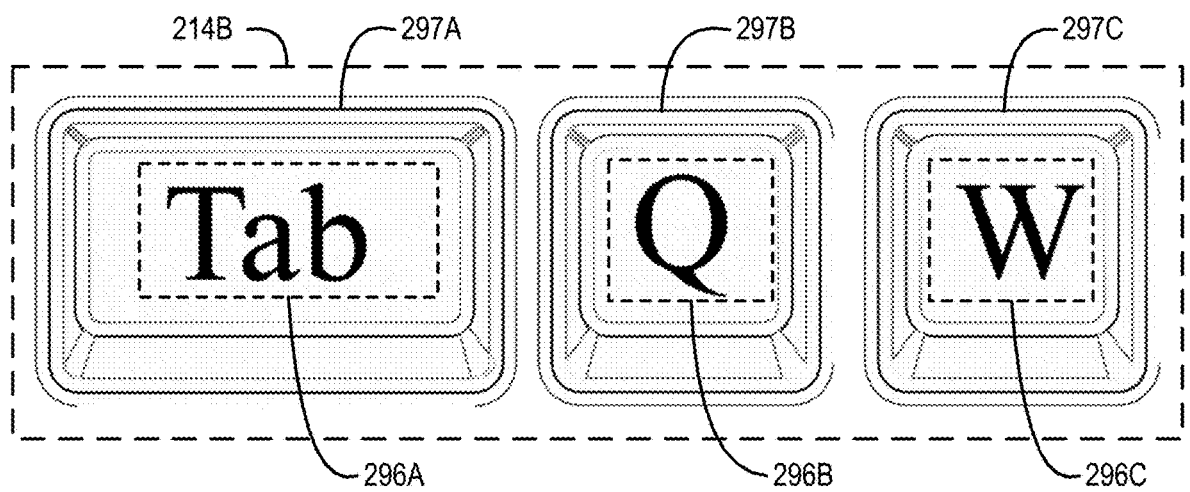

Turning now to FIG. 2B, a second example of an information handling system and an example of a portion of a keyboard are illustrated, according to one or more embodiments. In one or more embodiments, IHS 210 may include a chassis 212. For example, chassis 212 may be or may include a housing. For instance, chassis 212 may house components of IHS 210. In one or more embodiments, IHS 210 may include one or more user interfaces. For example, the one or more user interfaces may include a human interface device (HID). For instance, the one or more user interfaces may include a HID 214A and a HID 214B, among others. As an example, HID 214A may be or may include a touchpad. As another example, HID 214B may be or may include a keyboard. In one or more embodiments, the one or more user interfaces may include a display 224. For example, IHS 210 may display information via display 224. In one or more embodiments, display 224 may be or include a touch screen. For example, the touch screen may be or may include a HID. In one or more embodiments, the one or more user interfaces may be communicatively coupled to processor 220. For example, HID 214A, HID 214B, and display 224 may be communicatively coupled to processor 220. In one or more embodiments, when display 224 is or includes a touch screen, the touch screen may be communicatively coupled to processor 220.

In one or more embodiments, a skin temperature value associated with IHS 210 may include a temperature value associated with an outer portion of chassis 212. In one example, a first skin temperature value may be associated with an outer portion 294A of chassis 212. In a second example, a second skin temperature value may be associated with an outer portion 294B of chassis 212. In another example, a third skin temperature value may be associated with an outer portion 294C of chassis 212.

In one or more embodiments, a skin temperature value associated with IHS 210 may include a temperature associated with a HID 214. In one example, a fourth skin temperature value may be associated with an outer portion of HID 214A. In another example, a fifth skin temperature value may be associated with an outer portion of HID 214B. For instance, the fifth skin temperature value may be associated with a keyboard key 297 of HID 214B. As an example, a sixth skin temperature value may be associated with an outer portion 296A of a keyboard key 297A of HID 214B. As a second example, a seventh skin temperature value may be associated with an outer portion 296B of a keyboard key 297B of HID 214B. As another example, an eighth skin temperature value may be associated with an outer portion 296C of a keyboard key 297C of HID 214B.

In one or more embodiments, a skin temperature value associated with IHS 210 may be proportional to a performance of IHS 210. In one example, if a performance of IHS 210 is higher, a skin temperature value associated with IHS 210 may be higher. In another example, if a performance of IHS 210 is lower, a skin temperature value associated with IHS 210 may be lower. In one or more embodiments, performance of IHS 210 may be limited if a user is in physical contact with IHS 210. In one or more embodiments, performance of IHS 210 may be limited when one or more skin temperature values associated with IHS 210 are limited to one or more maximum threshold temperature values.

Figure 2C:
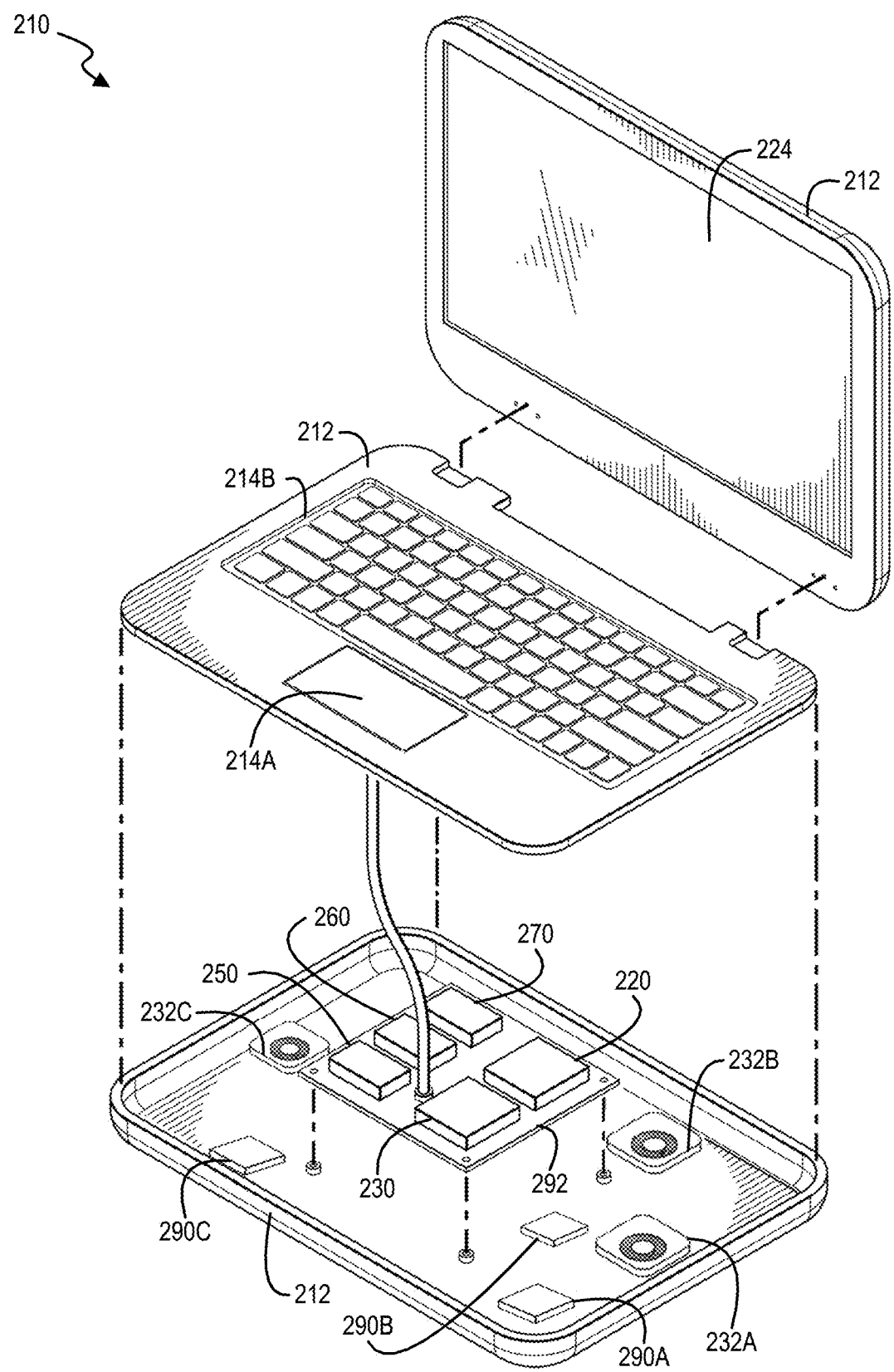
FIG. 2C illustrates another example of an information handling system, according to one or more embodiments.

Turning now to FIG. 2C, another example of an information handling system is illustrated, according to one or more embodiments. In one or more embodiments, chassis 212 may include a bottom lid, an interface lid, and a top lid, among others. In one example, a motherboard 292 may be mounted to the bottom lid. In a second example, human interface devices (HIDs) 214A and 214B may be mounted to the interface lid. In another example, display 224 may be mounted to the top lid.

In one or more embodiments, fans 232A-232C may be mounted within chassis 212. Although fans 232A-232C are illustrated at specific physical locations, fans 232A-232C may be at any physical locations, according to one or more embodiments. Moreover, although IHS 210 is illustrated as including fans 232A-232C, IHS 210 may include any number of fans 232, according to one or more embodiments. In one or more embodiments, sensors 290A-290C may be mounted within chassis 212. Although sensors 290A-290C are illustrated at specific physical locations, sensors 290A-290C may be at any physical locations, according to one or more embodiments. Moreover, although IHS 210 is illustrated as including sensors 290A-290C, IHS 210 may include any number of sensors 290, according to one or more embodiments. In one or more embodiments, EC 230 may control fans 232A-232C. For example, EC 230 may control fans 232A-232C based at least on one or more temperature values determined via one or more of sensors 290A-290C.

Figure 3:
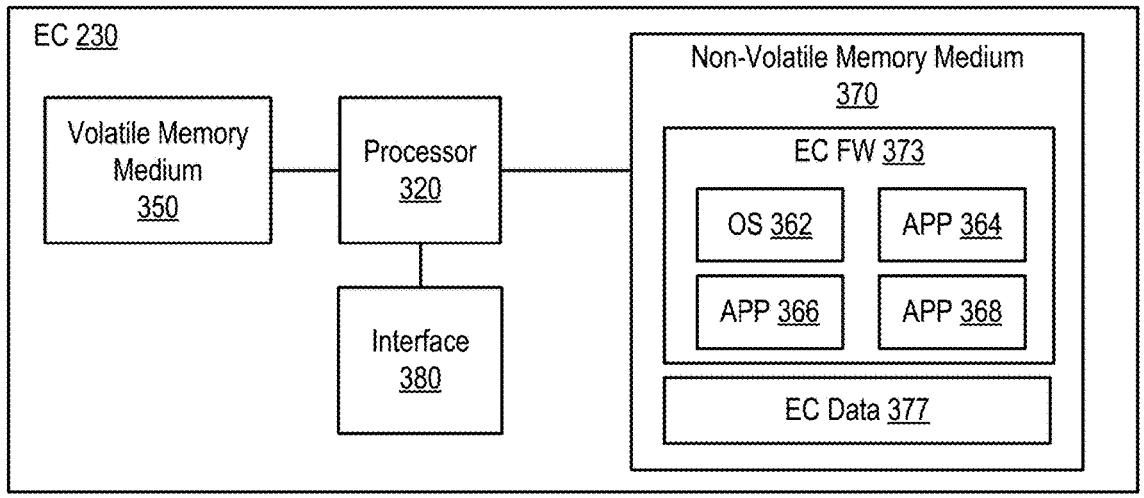
FIG. 3 illustrates an example of an embedded controller, according to one or more embodiments.

Turning now to FIG. 3, an example of an embedded controller is illustrated, according to one or more embodiments. As shown, EC 230 may include a processor 320, a volatile memory medium 350, a non-volatile memory medium 370, and an interface 380. As illustrated, non-volatile memory medium 370 may include a EC firmware (FW) 373, which may include an OS 362 and APPs 364-368, and may include EC data 377. In one example, OS 362 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 362 may be or include an Unix-like operating system. For instance, the Unix-like operating system may be or include LINUX®, FREEBSD®, NETBSD®, OpenBSD, Minix, Xinu, or Darwin, among others. In another example, OS 362 may be or include a portable operating system interface (POSIX) compliant operating system.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In a second example, interface 380 may include circuitry that enables one or more interrupt signals to be received. In one instance, interface 380 may include general purpose input/output (GPIO) circuitry, and the GPIO circuitry may enable one or more interrupt signals to be received and/or provided via at least one interrupt line. In another instance, interface 380 may include GPIO circuitry that may enable EC 230 to provide and/or receive signals associated with other circuitry (e.g., diagnostic circuitry, etc.). In a third example, interface 380 may include circuitry that enables communicatively coupling to one or more networks. In one instance, interface 380 may include circuitry that enables communicatively coupling to network interface 280. In another example, interface 380 may include a network interface.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with at least a portion of one or more systems, at least a portion of one or more flowcharts, at least a portion of one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may utilize EC data 377. In one example, processor 320 may utilize EC data 377 via non-volatile memory medium 370. In another example, one or more portions of EC data 377 may be transferred to volatile memory medium 350, and processor 320 may utilize EC data 377 via volatile memory medium 350.

Figure 4:
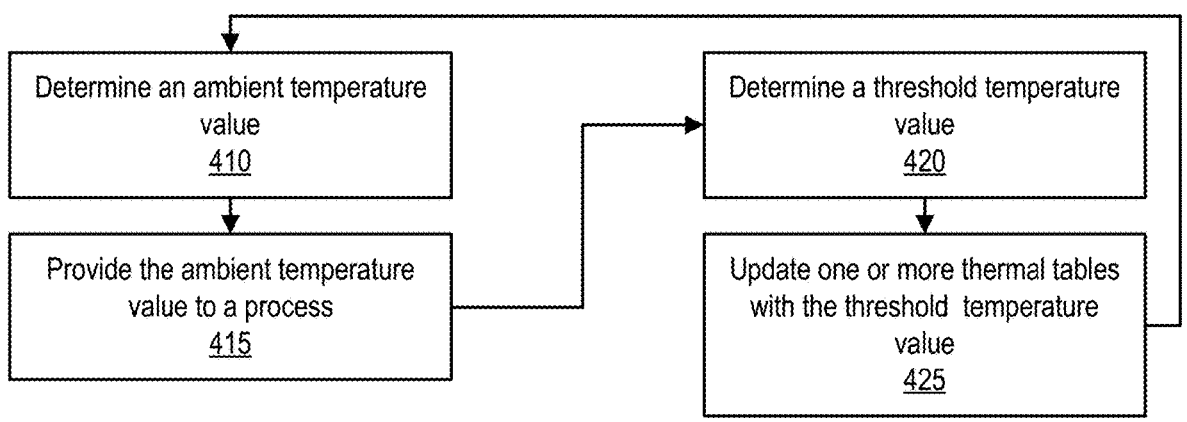
FIG. 4 illustrates an example of operating an information handling system, according to one or more embodiments.

Turning now to FIG. 4, an example of a method of operating an information handling system is illustrated, according to one or more embodiments. At 410, an ambient temperature value may be determined. For example, EC 230 may determine an ambient temperature value. For instance, EC 230 may determine the ambient temperature value via one or more of sensors 290A-290C. In one or more embodiments, the ambient temperature value may be associated with a temperature value of air proximate to IHS 210. For example, proximate to IHS 210 may be within twenty centimeters of IHS 210.

In one or more embodiments, a sensor 290 may be utilized to determine a temperature value within chassis 212. For example, the ambient temperature value may be determined based at least on the temperature value within chassis 212. In one or more embodiments, determining the ambient temperature value based at least on the temperature value within chassis 212 may include multiplying the temperature value within chassis 212 by a constant value. For example, EC 230 may multiply the temperature value within chassis 212 by a constant value to determine the ambient temperature value. In one or more embodiments, determining the ambient temperature value based at least on the temperature value within chassis 212 may include utilizing a lookup table. For example, the ambient temperature value may be associated with the temperature value within chassis 212 within the lookup table. For instance, EC 230 may determine the ambient temperature associated with the temperature value within chassis 212 from the lookup table.

In one or more embodiments, a sensor 290 utilized to determine the ambient temperature value may be physically located a distance from one or more components of IHS 210 as to not be greatly affected by heat from the one or more components of IHS 210. For example, a sensor 290 utilized to determine the ambient temperature value may be physically located a distance from motherboard 292. For instance, processor 220, EC 230, volatile memory medium 250, non-volatile memory medium 260, and non-volatile memory medium 270 may be mounted to motherboard 292. As an example, one or more of processor 220, EC 230, volatile memory medium 250, non-volatile memory medium 260, and non-volatile memory medium 270 may generate heat, which may affect temperature values determined via a sensor 290.

Figure 2D:
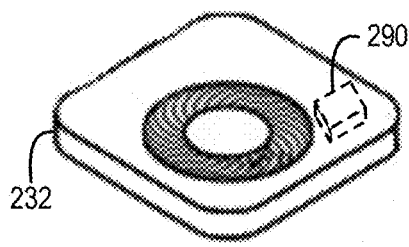
FIG. 2D illustrates an example of a sensor within a fan, according to one or more embodiments.

In one or more embodiments, a sensor 290 utilized to determine the ambient temperature value may be physically located near (e.g., within thirty millimeters) a fan 232. For example, fan 232 may take in air from outside IHS 210. For instance, the air from outside chassis 212 may travel across sensor 290 before the air from outside chassis 212 is heated by one or more components of IHS 210. In one or more embodiments, a sensor 290 utilized to determine the ambient temperature value may be physically located near (e.g., within thirty millimeters) a vent in chassis 212. For example, the vent in chassis 212 may take in air from outside IHS 210. For instance, the air from outside chassis 212 may travel across sensor 290 before the air from outside chassis 212 is heated by one or more components of IHS 210. In one or more embodiments, a sensor 290 utilized to determine the ambient temperature value may be physically located within a fan 232, as illustrated in FIG. 2D. For example, a fan 232 may include a sensor 290. In one or more embodiments, fan 232 may draw in air from outside chassis 212. For example, the air from outside chassis 212 may travel across sensor 290 before the air from outside chassis 212 is heated by one or more components of IHS 210.

At 415, the ambient temperature value may be provided to a process. For example, EC 230 may provide the ambient temperature value to a process. In one instance, the process may include a background process executing on IHS 210 in an OS context. In another instance, the process may include an application executing on IHS 210 in an OS context. In one or more embodiments, EC 230 may provide the ambient temperature value to the process via an original equipment manufacturer (OEM) variable. For example, EC 230 may provide the ambient temperature value in the OEM variable to the process via IHSFW 272. In one or more embodiments, EC 230 may provide the ambient temperature value to the process via IHSFW 272. For example, IHSFW 272 may provide the ambient temperature value to the process via a management information exchange. For instance, IHSFW 272 may provide the ambient temperature value to the process via one or more of a WMI and a CIM, among others. As an example, IHSFW 272 may provide the ambient temperature value in the OEM variable to the process via one or more of a WMI and a CIM, among others.

In one or more embodiments, the process may configure processor 220 based at least on the ambient temperature value. For example, the process may configure processor 220 with a maximum amount of power that processor 220 can utilize based at least on the ambient temperature value. In one or more embodiments, the process may utilize an INTEL® DTT to configure processor 220 based at least on the ambient temperature value. For example, the process may utilize the INTEL® DTT to configure processor 220 with a maximum amount of power that processor 220 can utilize based at least on the ambient temperature value. In one or more embodiments, configuring processor 220 with the maximum amount of power that processor 220 can utilize may configure processor 220 with a maximum amount of heat that processor 220 can generate. For example, when processor 220 is configured to not exceed the maximum amount of power that processor 220 can utilize, processor 220 may not generate heat above a maximum temperature value (e.g., a threshold temperature value) associated with processor 220.

At 420, a threshold temperature value may be determined. In one example, EC 230 may determine a threshold temperature value. In another example, the process may determine a threshold temperature value. In one or more embodiments, the threshold temperature value may be determined based at least on the ambient temperature value. For example, an equation 520 (shown in FIG. 5) may be utilized to determine the threshold temperature value, where $T_{Threshold}$ is the threshold temperature value and $T_{ambient}$ is the ambient temperature value. In one or more embodiments, $K_{Eff}$ of equation 520 may be a gain coefficient. For example, $K_{Eff}$ may adjust an effect of an ambient temperature value to a threshold temperature value (e.g., $T_{Threshold}$). In one instance, $K_{Eff}$ may be a constant value. In another instance, $K_{Eff}$ may be obtained from a lookup table based at least on a skin temperature of IHS 210.

At 425, one or more thermal tables may be updated with the threshold temperature value. For example, IHSFW 272 may update one or more thermal tables with the threshold value. In one or more embodiments, the one or more thermal tables updated with the threshold temperature value may configure processor 220. In one example, the one or more thermal tables updated with the threshold temperature value may configure processor 220 to utilize up to a maximum amount of power. In another example, the one or more thermal tables updated with the threshold temperature value may configure processor 220 to not exceed the threshold temperature value. In one or more embodiments, information indicating that the one or more thermal tables have been updated may be provided to the INTEL® DTT. In one or more embodiments, the method may proceed to 410.

Figure 5:
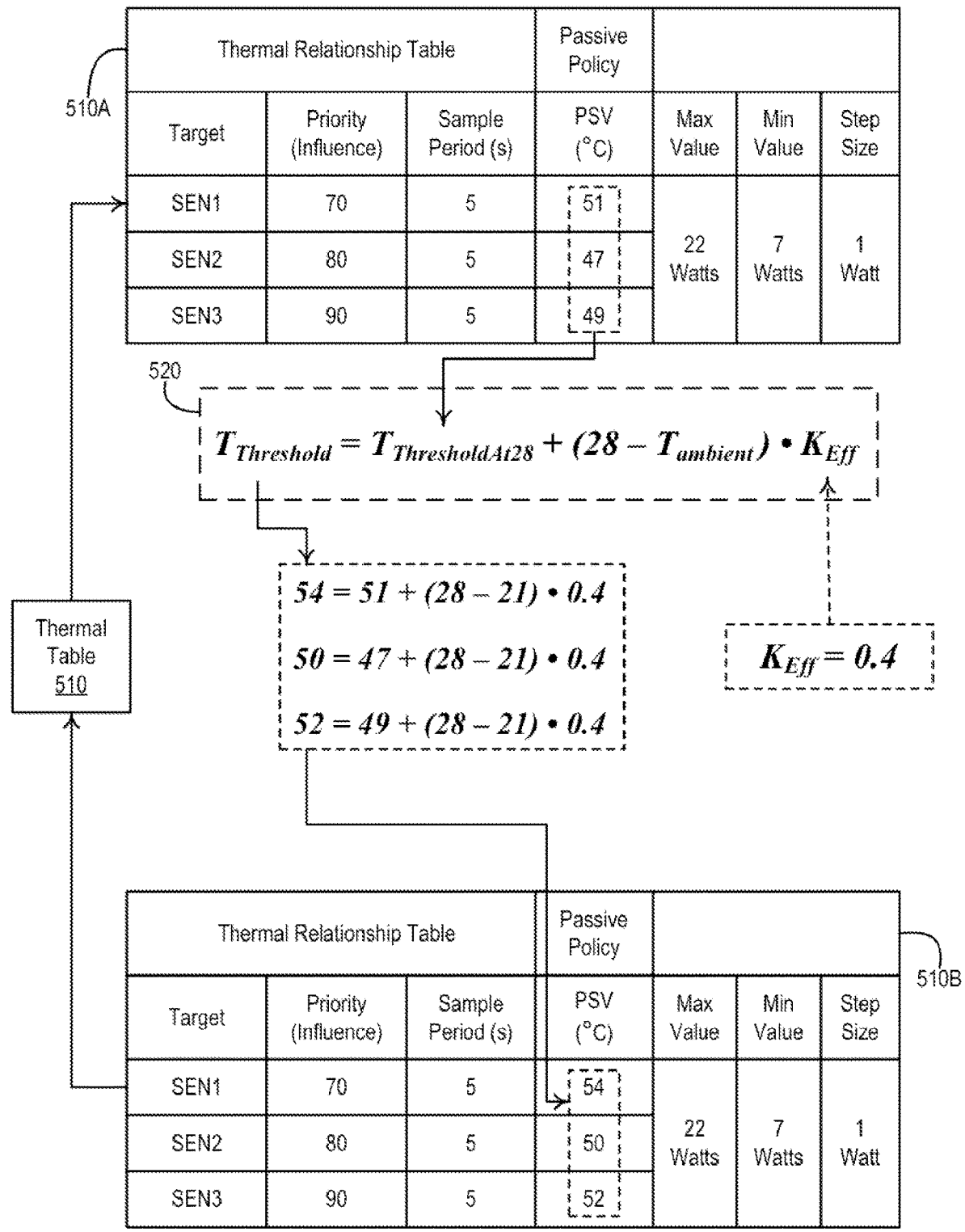
FIG. 5 illustrates examples of a thermal table and an equation utilizable to configure the thermal table, according to one or more embodiments.

As an example illustrated in FIG. 5, a thermal table 510 may include temperature values 51, 47, and 49 (in degree Celsius) as shown by a thermal table 510A. For instance, utilizing the temperature values 51, 47, and 49 as $T_{ThresholdAt28}$ and utilizing $T_{ambient}$ in equation 520, $T_{Threshold}$ may be determined and may be stored via a thermal table 510B, which may be stored via thermal table 510. As an example, temperature values 54, 50, and 52 (in degree Celsius) may be determined for $T_{Threshold}$ and may be stored via thermal table 510B, which may be stored via thermal table 510.

In one or more embodiments, determining $T_{Threshold}$ and storing $T_{Threshold}$ via thermal table 510 may limit processor 220 to not generate a temperature value above $T_{Threshold}$. For example, determining $T_{Threshold}$ and storing $T_{Threshold}$ via thermal table 510 may affect a skin temperature of IHS 210. For instance, thermal table 510 may configure processor 220 to utilize up to a maximum amount of power. As an example, when processor 220 is configured to utilize up to the maximum amount of power, processor 220 may generate up to a maximum amount of heat, which may be less than or equal to a temperature value of $T_{Threshold}$. In one or more embodiments, thermal table 510 may be or may include an ACPI table.

In one or more embodiments, EC 230 may update the one or more thermal tables. For example, EC 230 may include a thermal table. For instance, EC 230 may control one or more of fans 232A-232C based at least on the thermal table of EC 230. In one or more embodiments, utilizing the thermal table of EC 230 and thermal table 510 may be synchronized within an amount of time. For example, the thermal table of EC 230 and thermal table 510 may be synchronized within ten seconds.

Figure 6:
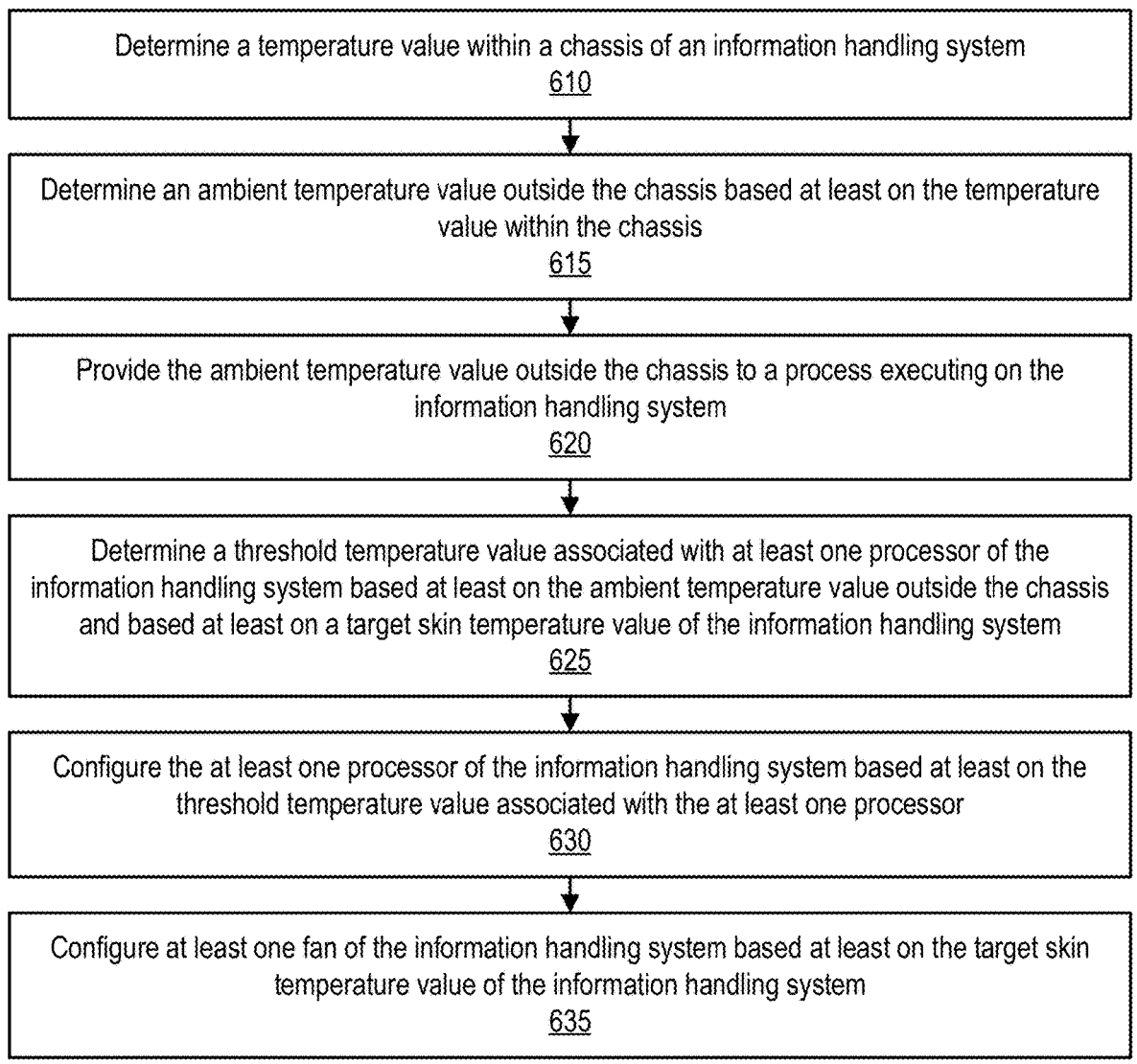
FIG. 6 illustrates another example of a method of operating an information handling system, according to one or more embodiments.

Turning now to FIG. 6, another example of a method of operating an information handling system is illustrated, according to one or more embodiments. At 610, a temperature value within a chassis of an information handling system may be determined. For example, EC 230 may determine a temperature value within chassis 212 of IHS 210. For instance, EC 230 may determine a temperature value within chassis 212 of IHS 210 via a sensor 290. As an example, EC 230 may determine a temperature value within chassis 212 of IHS 210 from at least one signal from sensor 290. In one or more embodiments, the chassis may include a vented port to air outside the information handling system. For example, the chassis may include a vented port to air outside the chassis. In one or more embodiments, the sensor may be physically located near the vented port. For example, near the vented port may be within twenty millimeters.

At 615, an ambient temperature value outside the chassis may be determined based at least on the temperature value within the chassis. For example, EC 230 may determine an ambient temperature value outside chassis 212 based at least on the temperature value within chassis 212. In one instance, determining the ambient temperature value outside the chassis based at least on the temperature value within the chassis may include multiplying the temperature value within the chassis by a constant value. In another instance, determining the ambient temperature value outside the chassis based at least on the temperature value within the chassis may include utilizing a lookup table to determine the ambient temperature value outside the chassis based at least on the temperature value within the chassis. As an example, the lookup table may include multiple temperature values within the chassis and respectively associated temperature values outside the chassis. For instance, a temperature value outside the chassis may be determined from a respectively associated temperature value within the chassis in the lookup table.

At 620, the ambient temperature value outside the chassis may be provided to a process executing on the information handling system. For example, EC 230 may provide the ambient temperature value outside the chassis to a process executing on IHS 210. For instance, EC 230 may provide the ambient temperature value outside the chassis to a process executing on IHS 210 via IHSFW 272. As an example, IHSFW 272 may provide the ambient temperature value outside the chassis to the process executing on IHS 210. In one or more embodiments, IHSFW 272 may provide the ambient temperature value outside the chassis to the process executing on IHS 210 via a management information exchange. For example, IHSFW 272 providing the ambient temperature value outside the chassis to the process executing on IHS 210 via the management information exchange may include IHSFW 272 providing the ambient temperature value outside the chassis to the process executing on IHS 210 via one or more of a WMI and a CIM, among others.

At 625, a threshold temperature value associated with at least one processor of the information handling system may be determined based at least on the ambient temperature value outside the chassis and based at least on a target skin temperature value of the information handling system. For example, the process executing on IHS 210 may determine a threshold temperature value associated with processor 220 based at least on the ambient temperature value outside chassis 212 and based at least on a target skin temperature value of IHS 210. For instance, the process executing on IHS 210 may determine $T_{Threshold}$ via equation 520, utilizing the ambient temperature value outside chassis 212 as $T_{ambient}$ and the target skin temperature value as $T_{ThresholdAt28}$. In one or more embodiments, the threshold temperature value associated with the at least one processor of the information handling system may be a maximum temperature value that the at least one processor is permitted to generate as the at least one processor executes instructions. For example, the threshold temperature value (e.g., $T_{Threshold}$) associated with processor 220 may be a maximum temperature value that processor 220 is permitted to generate as processor 220 executes instructions.

At 630, the at least one processor of the information handling system may be configured based at least on the threshold temperature value associated with the at least one processor. For example, the process executing on IHS 210 may configure processor 220 based at least on the threshold temperature value associated with processor 220. For instance, the process executing on IHS 210 may configure processor 220 based at least on $T_{Threshold}$, determined via equation 520, associated with processor 220. As an example, the process executing on IHS 210 may utilize an INTEL® DTT to configure processor 220 based at least on $T_{Threshold}$, determined via equation 520, associated with processor 220. In one or more embodiments, configuring the at least one processor of the information handling system based at least on the threshold temperature value may including limiting a temperature value of the at least one processor to less than or equal to the threshold temperature value. For example, configuring processor 220 based at least on $T_{Threshold}$ may including limiting a temperature value of processor 220 to less than or equal to $T_{Threshold}$. In one or more embodiments, the process executing on IHS 210 may configure processor 220 with a maximum amount of power that processor 220 can utilize. For example, the process executing on IHS 210 may configure processor 220 may utilize INTEL® DTT to configure processor 220 with a maximum amount of power that processor 220 can utilize.

At 635, at least one fan of the information handling system may be configured based at least on the target skin temperature value of the information handling system. For example, EC 230 may configure at least one fan 232 of IHS 210 based at least on the target skin temperature value of IHS 210. For instance, EC 230 may determine a fan speed based at least on the ambient temperature value outside the chassis and/or based at least on the target skin temperature value of IHS 210. As an example, EC 230 may configure at least one fan 232 to operate at the fan speed.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one first processor;
an embedded controller coupled to the at least one first processor;
a first memory medium, coupled to the at least one first processor, that stores first instructions of a process executable by the at least one first processor;
at least one fan; and
a chassis that houses the at least one first processor, the embedded controller, the first memory medium, and the at least one fan;
wherein the embedded controller includes a second processor, different from the at least one first processor, and a second memory medium, different from the first memory medium and coupled to the second processor, that stores second instructions executable the second processor, which when executed by the second processor, cause the embedded controller to:
determine whether a user is in physical contact with at least a portion of the information handling system;
determine a temperature value within the chassis;
determine a current ambient temperature value outside the chassis based at least on the temperature value within the chassis; and
provide the current ambient temperature value outside the chassis to the process executed by the at least one first processor of the information handling system; and
wherein the process is configured to:
in response to the embedded controller determining that the user is in physical contact with at least the portion of the information handling system, limit a performance of the information handling system, including:
determine a threshold temperature value associated with the at least one first processor based at least on i) the current ambient temperature value outside the chassis, and ii) a target skin temperature value of the information handling system, including:
determining a difference between a constant and the current ambient temperature value;
determining a multiple of the difference and a gain coefficient; and determining the threshold temperature value as a summation of the multiple and the target skin temperature value; and configure the at least one first processor of the information handling system based at least on the threshold temperature value associated with the at least one first processor;

in response to the embedded controller determining that the user is not in physical contact with at least the portion of the information handling system:

configure the at least one first processor of the information handling system to exceed the threshold temperature value associated with the at least one first processor.

2. The information handling system of claim 1, wherein, to provide the current ambient temperature value outside the chassis to the process executing on the information handling system, the second instructions further cause the embedded controller to provide the current ambient temperature value outside the chassis to information handling system firmware of the information handling system.

3. The information handling system of claim 2, wherein the information handling system firmware is configured to:
provide the current ambient temperature value outside the chassis to the process executing on the information handling system.

4. The information handling system of claim 1, further comprising:
a sensor coupled to the embedded controller and within the chassis;
wherein, to determine the temperature value within the chassis, the second instructions further cause the embedded controller to determine the temperature value within the chassis from at least one signal from the sensor.

5. The information handling system of claim 4,
wherein the chassis includes a vented port to air outside the chassis; and
wherein the sensor is physically located near the vented port.

6. The information handling system of claim 1, wherein, to configure the at least one first processor, the process is further configured to configure the at least one first processor with a maximum amount of power that the at least one first processor can utilize.

7. The information handling system of claim 1,
wherein the second instructions further cause the embedded controller to:
configure the at least one fan based at least on the target skin temperature value of the information handling system.

8. The information handling system of claim 7,
wherein the second instructions further cause the embedded controller to determine a fan speed based at least on the current ambient temperature value outside the chassis; and
wherein, to the configure the at least one fan based at least on the target skin temperature value of the information handling system, the second instructions further cause the embedded controller to configure the at least one fan to operate at the fan speed.

9. The information handling system of claim 1, wherein the embedded controller is a microcontroller.

10. A method, comprising:
determining, by an embedded controller of an information handling system that includes a chassis, at least one first processor, and a first memory medium that includes first instructions executable by the at least one first processor, a temperature value within the chassis, wherein the embedded controller is communicatively coupled to the at least one first processor and includes a second processor, different from the at least one first processor, and a second memory medium, different from the first memory medium, that includes second instructions executable by the second processor;

determining, by the embedded controller, whether a user is in physical contact with at least a portion of the information handling system;

determining, by the embedded controller, a current ambient temperature value outside the chassis based at least on the temperature value within the chassis;

providing, by the embedded controller, the current ambient temperature value outside the chassis to a process executing on the information handling system;

in response to the embedded controller determining that the user is in physical contact with at least the portion of the information handling system, limiting a performance of the information handling system, including:

determining, by the process executing on the information handling system, a threshold temperature value associated with the at least one first processor of the information handling system based at least on i) the ambient temperature value outside the chassis, and ii) a target skin temperature value of the information handling system, including:
determining a difference between a constant and the current ambient temperature value;
determining a multiple of the difference and a gain coefficient; and
determining the threshold temperature value as a summation of the multiple and the target skin temperature value; and configuring, by the process executing on the information handling system, the at least one first processor of the information handling system based at least on the threshold temperature value associated with the at least one first processor;

in response to the embedded controller determining that the user is not in physical contact with at least the portion of the information handling system:
configuring, by the process executing on the information handling system, the at least one first processor of the information to exceed the threshold temperature value associated with the at least one first processor.

11. The method of claim 10, wherein the providing the current ambient temperature value outside the chassis to the process executing on the information handling system includes providing the current ambient temperature value outside the chassis to information handling system firmware of the information handling system.

12. The method of claim 11, further comprising:
providing, by the information handling system firmware, the current ambient temperature value outside the chassis to the process executing on the information handling system.

13. The method of claim 10, wherein the determining the temperature value within the chassis includes determining the temperature value within the chassis from at least one signal from a sensor of the information handling system and within the chassis.

14. The method of claim 13,
wherein the chassis includes a vented port to air outside the chassis; and
wherein the sensor is physically located near the vented port.

15. The method of claim 10, wherein the configuring the at least one first processor includes configuring the at least one first processor with a maximum amount of power that the at least one first processor can utilize.

16. The method of claim 10, further comprising:
configuring, by the embedded controller, at least one fan of the information handling system based at least on the target skin temperature value of the information handling system.

17. The method of claim 16, further comprising:
determining, by the embedded controller, a fan speed based at least on the current ambient temperature value outside the chassis;
wherein the configuring the at least one fan of the information handling system based at least on the target skin temperature value of the information handling system includes configuring the at least one fan of the information handling system to operate at the fan speed.

18. The method of claim 10, wherein the embedded controller is a microcontroller.

\* \* \* \* \*